United States Patent [19]

Pampouchidis et al.

[11] 4,389,509

[45] Jun. 21, 1983

[54] CATHODICALLY DEPOSITABLE COATING COMPOSITIONS

[75] Inventors: Georgios Pampouchidis; Wolfgang Daimer; Heiner Verdino, all of Graz, Austria

[73] Assignee: Vianova Kunstharz, A.G., Vienna, Austria

[21] Appl. No.: 860,145

[22] Filed: Dec. 19, 1977

[30] Foreign Application Priority Data

Dec. 13, 1976 [AT] Austria .................................. 9210/76

[51] Int. Cl.$^3$ ............................................. C08L 75/04
[52] U.S. Cl. .................................. 524/591; 204/181 C; 523/415; 524/507; 524/901; 528/67; 528/71; 528/75
[58] Field of Search ................ 260/29.2 TN, 29.2 EP, 260/29.7 H; 204/181 C; 524/591, 507, 901; 523/415; 525/128; 528/67, 71, 75

[56] References Cited

U.S. PATENT DOCUMENTS 3,674,743 7/1972 Verdol et al. ...................... 528/242
4,237,038 12/1980 Pampouchidis et al. ... 260/29.2 TN
4,238,594 7/1977 Pampouchidis ....................... 528/69

Primary Examiner—Theodore E. Pertilla
Attorney, Agent, or Firm—A. W. Breiner

[57] ABSTRACT

Cathodically depositable, aqueous coating compositions comprising the reaction product of (A) diene polymers containing free hydroxyl groups with a hydroxyl number of at least 40 mg KOH/g and an average maximum molecular weight of 4000; and (B) a compound having an average of from about 0.8 to 1.5 free isocyanate groups and at least one basic aliphatically bound nitrogen atom. Optionally, there can be included in the reaction product a compound having from about 0.8 to 1.5 free isocyanate groups and from 1 to 3 ethylenically unsaturated double bonds. The coating compositions cure at relatively low temperatures and relatively short curing times to provide films having excellent resistance to water, chemicals, and corrosion.

11 Claims, No Drawings

CATHODICALLY DEPOSITABLE COATING COMPOSITIONS

FIELD OF INVENTION AND BACKGROUND

The present invention is directed to the preparation of, and coating compositions which are water-dilutable upon neutralization with acids. The coating compositions are electrically depositable at the cathode of an electrodeposition system and will crosslink through thermal polymerization.

Electrodeposition of synthetic resins and plastics, although known for substantial time, has gained technical importance as a coating process in only recent years. The coating compositions or binders primarily used for commercial electrodeposition contain polycarboxylic acid resins neutralized with bases. The products deposit at the anode of an electrodeposition system. Owing to the acidic character of the resins, they are sensitive to corroding influences exerted by salts and particularly by alkalis. Furthermore, coatings of the aforesaid compositions tend to undergo spot discoloration or undergo other chemical changes as a result of the metal ions anodically dissolved from the anode. Accordingly, there has been a desire to use coating compositions which will deposit at the cathode of an electrodeposition system.

A substantial number of binders are disclosed in the literature carrying groupings neutralizable with acids which can be deposited on cathodically wired objects of an electrodeposition system. Many have disadvantages primarily due to the need to have crosslinking additives in the coating compositions which adversely affect film characteristics. Recently, however, coating compositions have been provided which are self-crosslinking through thermal polymerization. These self-crosslinking binders includes binders comprising (A) the reaction products of diepoxy compounds with alpha, beta-unsaturated acids and, optionally, long chain fatty acids, and basic monoisocyanates as described in copending application Ser. No. 816,936 filed July 19, 1977, U.S. Pat. No. 4,238,594, issued Dec. 9, 1980, assigned to the assignee of the present application;

(B) reaction products of diepoxy compounds with monoamines and, optionally, fatty acids, and unsaturated monoisocyanates as described in copending application Ser. No. 816,937 filed July 19, 1977, U.S. Pat. No. 4,320,220, issued Mar. 16, 1982, assigned to the assignee of the present appllication; and (C) two moles of a diepoxy compound plus one mole of a primary-tertiary or secondary-secondary diamine plus two moles of an alpha, beta-unsaturated monocarboxylic acid and, optionally, an unsaturated fatty acid, plus an unsaturated monoisocyanate as described in copending application Ser. No. 849,265 filed Nov. 7, 1977, U.S. Pat. No. 4,147,676, issued Apr. 3, 1979, assigned to the assignee of the present application.

The aforesaid binders are highly desirable due to their ability to self-crosslink through the presence of alpha,-beta-unsaturation; their being water-soluble in the presence of acids due to the basic nitrogen atoms, and their ability to provide excellent films with good performance characteristics, particularly regarding resistance to corroding influences. The aforesaid binders, however, utilize expensive components and, accordingly, cannot be used for many applications because of cost.

OBJECTS OF THE INVENTION AND GENERAL DESCRIPTION

It has now been found that components containing basic functional nitrogen groups for neutralization with inorganic or organic acids can be derived from components which are relatively inexpensive, but which provide coating compositions having excellent resistance to water, chemicals, and corrosion. The relatively low cost of the components permits the use of cathodic electrodeposition on a substantially wider scale than heretofore possible.

The basic functional nitrogen atoms according to this invention are introduced into substantially non-saponifiable diene polymers having a main polymer chain of co-valent carbon atoms carrying free hydroxyl groups and comprising essentially the reaction product of (A) diene polymers having free hydroxyl groups with a hydroxyl number of at least about 40 mg KOH/g and an average maximum molecular weight of 4000; and (B) compounds carrying per molecule an average of from 0.8 to 1.5, and preferably one free isocyanate group and at least one basic aliphatically bound nitrogen atom. Optionally, there can be present a compound (C) carrying per molecule an average of from 0.8 to about 1.5, and preferably one free isocyanate group and from 1 to 3 ethylenically unsaturated double bonds per molecule. Components (A) and (B), and optionally (C), are reacted at from about 10° to 100° C., and preferably from about 50° to 80° C., to an NCO-value of substantially zero. The reaction, if desired, can be carried out in the presence of an isocyanate inert solvent. Catalyst can be included if desired. The reaction product is partially or totally neutralized with inorganic or organic acids.

Unsaturated polymers of dienes with free hydroxy groups, suitable for use in the present invention, include copolymers of alkane dienes or cycloalkanedienes with hydroxy groups containing monovinyl compounds and, optionally, subordinate quantities of other monovinyl compounds. Suitable diene compounds include 1,3-butadiene, 1,3-pentadiene, cyclopentadiene or isoprene, while hydroxy group containing monovinyl compounds are allyl alcohol or hydroxy alkyl esters or hydroxyalkylene oxide esters of acrylic or methacrylic acid. Another known method to introduce preferably chain ending hydroxyl groups into diene polymers is the reaction of so-called "living polymers" with alkylene oxides, preferably ethylene oxide. A group of diene polymers with latent hydroxy groups are epoxidation products of diene polymers. The products are prepared in known manner through treatment of liquid diene polymers with per-formic acid or per-acetic acid. In oxirane structures, the oxirane group is considered a latent hydroxy group since a hydroxy group is set free upon reaction with a compound carrying an active hydrogen atom. The reaction can be carried out at temperatures of up to 150° C., either with monocarboxylic acids or saturated or unsaturated fatty acids, benzoic acid, p-tert.-butylbenzoic acid, sorbic acid, and the like, and may optionally be accelerated by alkaline catalysts. Another manner of releasing free hydroxy groups from partially epoxidized diene polymers which is an advantage for the use of the products produced according to the invention is the reaction of the epoxy group with secondary alkylamines or secondary alkanol amines, such as diethylamine, diethanol amine, diisopropylamine. The introduction of the nitrogen atom into the polymer chain increases the basic character of the macromolecule in the desired way. The secondary hydroxy group which forms on the opening of the oxirane ring is used according to the invention for reaction with the isocyanate containing components.

The basic nitrogen atoms are introduced into the diene polymer containing free hydroxyl groups according to this invention by reaction with compounds carrying per molecule an average of from 0.8 to 1.5 isocyanate groups and at least one tertiary basic nitrogen atom. Preferably the compounds contain an average of about one isocyanate group in the molecule.

The compounds containing the basic nitrogen atom are prepared in a separate step by reacting diisocyanates or polyisocyanates with less than a stoichiometric quantity of an amine of the formula

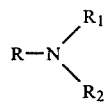

R being an alkanol or hyroxyphenyl radical, and $R_1$ and $R_2$ being alkyl radicals or cycloalkyl radicals. Dialkylalkanol amines are preferred including dimethylethanol amine, diethylethanol amine or higher homologues and isomers thereof.

Suitable polyisocyanates for use in preparing the intermediate basic nitrogen carrying component are aromatic isocyanates such as 2,4- or 2,6-toluylene diisocyanate or mixtures thereof, 4,4'-diphenylmethanediisocyanate or cycloaliphatic isocyanates such as isophorone diisocyanate, cyclohexane-1,4-diisocyanate, as well as aliphatic isocyanates, such as trimethylhexamethylene-1,6-diisocyanate; tris-hexamethylenetriisocyanate.

The reaction between the amine and the polyisocyanate is carried out at from 0° to 80° C., preferably at from 20° to 50° C. The weight ratios between the reaction partners are chosen in order that the formed compound carries from about 0.8 to 1.5, and preferably one free isocyanate group. This product is at times herein designated as the "basic isocyanate intermediate."

In order to enhance the thermal crosslinking reaction of the cathodically deposited film, it is desirable to react the reaction products of the hydroxy containing diene polymer and basic isocyanate intermediate with compounds carrying from about 0.8 to 1.5 free isocyanate groups in the molecule and from 1 to 3 olefinically unsaturated double bonds. These compounds are prepared in a separate reaction step from the aforementioned polyisocyanates and a reaction partner which carries at least one isocyanate reactive hydrogen atom and from 1 to 3 olefinic double bonds. Suitable unsaturated compounds include hydroxyalkyl esters of acrylic acid or methacrylic acid, triethyleneglycol mono(meth)acrylate, trimethylolpropanedi(meth)acrylate, allyl alcohol, tripropyleneglycol monoabietate, oleyl alcohol, or linoleyl alcohol. The reaction between the polyisocyanate and the isocyanate reactive olefinically unsaturated compound is carried out, optionally in an isocyanate inert solvent, at temperatures of from 10° to 100° C., and preferably from about 50° to 80° C. Organic stannous compounds, as catalysts, can be advantageously used. The weight ratios of the reactants are chosen such that the formed compound carried from about 0.8 to 1.5, and preferably one free isocyanate group in the molecule. The compound is at times herein designated as the "olefinically unsaturated isocyanate intermediate."

The reaction components used in preparing the binders of the present invention are effected in order that the hydroxy group containing unsaturated diene polymers, preferably dissolved in isocyanate-inert solvents, are reacted at from 10° to 100° C., preferably at from 50° to 80° C., with the desired quantity of the basic isocyanate intermediate and, optionally, with the olefinically unsaturated isocyanate intermediate, optionally in the presence of organic stannous compounds as catalysts, until an NCO-value of zero is obtained. The quantity of basic isocyanate intermediate is chosen in order that the basicity of the binder upon neutralization with the acid will provide sufficient water dilutability at a pH-value of from 4 to 9, and preferably 6 to 8. The reaction between the hydroxy group containing polycondensates, the basic isocyanate intermediate, and the olefinically unsaturated intermediate may be effected in random sequence, separately or jointly.

In order to reduce the stoving temperatures or to obtain a particular corrosion protection it can be of advantage, although not essential, to co-employ additional known crosslinking agents, such as melamine- or phenol-formaldehyde condensates. Such resins are prepared according to known methods by alkaline condensation of formaldehyde or of formaldehyde-splitting substances with urea, melamine, benzoguanamine, acetoguanamine, phenol, cresol, p.-tert.-butylphenol, Bisphenol A, and the like. The methylol compounds may be optionally etherified with alcohols. A preferred product in this group is the reaction product of phenol with formaldehyde carrying allyl ether groups. If the crosslinking agents are non-water-soluble, it is advantageous to combine them by careful condensation with the binder of the invention at temperatures of from 50° to 120° C. The reaction is carried out until excellent dilutability with water of the reaction mass upon neutralization with low molecular weight organic acids is obtained.

The basic nitrogen atoms of the coating compositions of the invention are partially or totally neutralized with organic and/or inorganic acids such as formic acid, acetic acid, lactic acid, and phosphoric acid. The degree of neutralization in the individual case depends upon the properties of the binder employed. In general, sufficient acid is added to allow dispersion or dilution with water at a pH-value of the coating of from about 4 to 9, and preferably of from about 6 to 8.

The concentration in water of the binder depends upon the parameters of electrodeposition and may lie in a range of between about 3 to 30 percent by weight, preferably at from about 5 to 15 percent by weight. The applied coating composition can optionally contain various additives, such as pigments, extenders, surface active agents, etc. Upon electrodeposition, the binder of the invention as a vehicle of the aqueous coating composition is wired to a conductive anode and cathode, the surface of the cathode being coated with the coating composition. The conductive substrates to be coated may be of a variety of materials, and particularly metals such as steel, aluminum, copper, or the like. Other metalized materials or materials rendered conductive through a conductive coating can be employed. After deposition, the coating is cured at a stoving temperature of from about 130° to 200° C., preferably 150° to 180° C. for about 5 to 30 minutes, preferably 10 to 25 minutes.

The following examples illustrate the invention without limiting its scope.

DESCRIPTION OF THE INTERMEDIATES USED IN THE EXAMPLES (A) Hydroxyl Group Containing Diene Polymers Intermediate (A 1):

Commercially available liquid polybutadiene with a hydroxyl number of 67 mg KOH/g, a molecular weight of about 1400 and a microstructure of about 90 percent 1,2-vinyl- and about 10 percent 1,4-trans configuration is used. (Polybutadiene G 1000 manufactured by Nippon Soda Co., Ltd.)

Intermediate (A 2):

Commercially available liquid polybutadiene with a hydroxyl number of 47 mg KOH/g, a molecular weight of about 2800 and a microstructure of about 20 percent 1,2-vinyl- and about 60 percent 1,4-trans and 20 percent 1,4-cis- configuration. (Polybutadiene R 45 HT manufactured by Arco Chemical Company)

Intermediate (A 3):

In a three-neck flask equipped with stirrer, inert gas duct and reflux condensor, 1000 g of an epoxidized polybutadiene (1) are heated to 100° C. and mixed with 885 g of p-tert.-butylbenzoic acid and 2 g of triethylamine. The temperature is raised to 180° C. and the reaction is carried to an acid value of below 3 mg KOH/g. Hydroxyl number of the end product is approximately 200 mg KOH/g. The epoxidized polybutadiene has a molecular weight of about 1500, an epoxy equivalent of about 160, and a microstructure of 75 percent of 1,4-cis and 25 percent of 1,4-trans configuration.

Intermediate (A 4):

1000 g of the epoxidized polybutadiene used for intermediate (A 3) are heated to 180° C. within 3 hours together with 525 g of diethanol amine, maintaining reflux condensation and inert gas protection. After another three hours at this temperature, 95 percent of the used amine has reacted. A product with a hydroxyl number of about 600 mg KOH/g results.

(B) Basic Isocyanate Intermediates

Intermediate (B 1):

174 g of toluylene diisocyanate (a blend of 80 percent of 2,4- and 20 percent of 2,6-isomers) are charged to a three-neck flask equipped with reflux condensor and inert gas duct, and, with absolute protection from moisture and effective cooling, 89 g of dimethylethanol amine, 60 percent in ethyleneglycol monoethylether acetate, are continuously added. The reaction temperature is held below 25° C. The reaction is finished when the theoretical isocyanate value is 16 percent or lower.

Intermediate (B 2):

174 g of toluylene diisocyanate (a blend of 80 percent of 2,4- and 20 percent of 2,6-isomers) are mixed with 194 g of ethyleneglycol monoethylether acetate in a three-neck flask equipped with reflux condensor and inert gas duct. Access of moisture is absolutely prevented. With intense cooling, 117 g of diethylethanolamine are added continuously within one hour at a temperature of below 25° C. The isocyanate value of the final product is 14.4 percent.

(C) Olefinically Unsaturated Isocyanate Intermediates

Intermediate (C 1):

168 g of hexamethylene diisocyanate are mixed with 200 g of ethyleneglycol monoethylether acetate in a three-neck flask with reflux condensor and inert gas duct and, while maintaining total prevention of moisture access, is heated to 60° C. At the stated temperature a blend of 130 g of hydroxyethylmethacrylate, stabilized with 0.1 g of hydroquinone, are added dropwise. The reaction is finished, about 2 hours, when the isocyanate value has attained 14.1 percent or slightly less.

Intermediate (C 2):

In a three-neck flask equipped with reflux condensor and inert gas duct, with no possible access of moisture, 222 g of isophorone diisocyanate are blended with 325 g of ethyleneglycol monoethylether acetate and heated to 40° C. 265 g of linoleyl alcohol are then added continuously and, after the end of the addition, the temperature is raised to 90° C. and held, until the isocyanate value has attained 8.6.

EXAMPLES 1–4

In a reaction vessel equipped with stirrer, addition funnel, thermometer and reflux condensor, the hydroxy-rich diene polymer (Intermediate A), in the presence of ethylene glycol monoethylether acetate, an isocyanate inert solvent, is blended with a basic isocyanate intermediate (Intermediate B), preventing access of moisture, and is reacted at 40° to 100° C. to an NCO-value of approximately zero. Subsequently, the reaction product is optionally mixed with an alpha,beta-olefinically unsaturated isocyanate intermediate (Intermediate C) and reacted, also at from 40° to 100° C., until an NCO-value of zero is obtained.

The reaction of Intermediate A with Intermediate B and Intermediate C may also be effected in one reaction step at from 40° to 100° C., with the same results.

It is also possible to blend the described reaction products with crosslinking agents such as urea resins, melamine resins, or phenolformaldehyde resins and carefully reacted until substantial water dilutability is attained.

The quantities of the Intermediates and the reactions conditions for Examples 1–4 are tabulated in Table 1.

TABLE 1

| | Intermediates (g)(+) | | | Crosslinkers(+) | | Reaction Conditions h/°C. |
|---|---|---|---|---|---|---|
| 1 | 1000 A1 | 485 B2 | — | — | — | 1/55 |
| 2 | 1000 A2 | 352 B1 | — | — | — | 1/40 |
| 3 | 1887 A3 | 485 B2 | 249 C1 | 580 BP | — | 1/80(++) |
| 4 | 1525 A4 | 220 B1 | 253 C2 | — | 452 PA | 3/60(+++) |

(+)All quantities refer to resin solids
(++)Subsequent reaction with Intermediates B and C
(+++)Simultaneous reaction with Intermediates B and C
Key to abbreviations in Table 1:
PB: Bisphenol A-formaldehyde resin
PA: Phenol-formaldehyde resin with allyl ether groups (Methylon 75108 manufactured by General Electric)

Evaluation of the Binders

Of the binders each 100 g resin solids samples were mixed with the corresponding quantity of acid and made up to 1000 g with deionized water while stirring. The 10 percent solutions were deposited using direct current on steel panels as the cathode. Deposition time in all cases was 60 seconds. The coated substrates were rinsed with deionized water and cured at elevated temperature. Average film thickness of the cured films was between 13 to 17 μm. Table 2 gives a summary of the evaluation.

TABLE 2

| Examples | Neutralization | | | Deposition | | Evaluation | | |
|---|---|---|---|---|---|---|---|---|
| | Quantity[1] | Type[2] | pH[3] | Volt | Cure Min/°C. | Hardness[4] | Indentation[5] | Resistance[6]/[7] |
| 1 | 3.8 | E | 6.0 | 190 | 20/190 | 165 | 7.8 | 320/120 |
| 2 | 3.5 | M | 5.8 | 180 | 30/180 | 155 | 7.2 | 320/420 |
| 3 | 4.0 | M | 6.2 | 240 | 30/170 | 185 | 8.1 | 320/360 |
| 4 | 3.8 | E | 6.0 | 220 | 25/180 | 170 | 8.3 | 480/360 |

[1] quantity of acid in g added to 100 g of resin solids
[2] E: acetic acid; M: lactic acid
[3] measured as a 10% aqueous solution
[4] Konig pendulum hardness DIN 53 157 (sec)
[5] Erichsen indentation DIN 53 156 (mm)
[6] hours of water soak at 40° C. until corrosion or blistering become visible
[7] salt spray ASTM-B 117-64: 2 mm of corrosion at the cross incision after the stated hours For the evaluation degreased non-pretreated steel panels were coated with a pigmented paint consisting of 100 parts by weight of resin solids, 20 parts by weight of aluminum silicate pigment and 2 parts by weight of carbon black.

In the above illustrative examples various modifications can be made falling within the scope of the claimed invention. Such modifications being within the ability of one skilled in the art are within the scope of the present invention.

It is claimed:

1. Thermosetting aqueous binders for cathodically depositable coatings comprising the reaction product of (A) a hydroxyl group containing diene polymer having a hydroxyl number of at least about 40 mg KOH/g, and an average maximum molecular weight of about 4000; and (B) compounds carrying per molecule an average of from about 0.8 to 1.5 free isocyanate groups and at least one basic aliphatically bound nitrogen atom, neutralized with inorganic or organic acids.

2. The thermosetting aqueous binders of claim 1 wherein the free isocyanate groups per molecule of compound (B) is 1.

3. The thermosetting aqueous binders of claim 1 including within the reaction product component (C) having per molecule an average of from 0.8 to 1.5 free isocyanate groups and from about 1 to 3 olefinic double bonds.

4. The thermosetting aqueous binders of claim 1 wherein the unsaturated diene polymer is a copolymer of a diene polymer and hydroxyl group containing monovinyl compounds.

5. The thermosetting aqueous binders of claim 1 wherein component (A) is an unsaturated diene polymer having free hydroxyl groups at the chain end of the polymers.

6. The thermosetting aqueous binders of claim 1 wherein component (A) of the reaction product is epoxidized.

7. The thermosetting aqueous binders of claim 1 wherein component (B) is the reaction product of a polyisocyanate with an amine of the formula

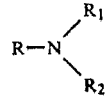

wherein R is an alkanol or hydroxyphenol radical, and $R_1$ and $R_2$ are alkyl or cycloalkyl radicals.

8. The thermosetting aqueous binders of claim 1 including a crosslinking agent.

9. The thermosetting aqueous binders of claim 8 wherein the crosslinking agent is urea-, melamine-, or phenol-aldehyde condensate.

10. The process of providing coating compositions which will cathodically deposit when used in an electrodeposition process including reacting at a temperature of from about 10° to 100° C. (A) a diene polymer having free hydroxyl groups and a hydroxyl number of at least about 40 mg KOH/g and an average molecular weight of about 4000; and (B) compounds carrying per molecule an average of from about 0.8 to 1.5 free isocyanate groups and at least one basic aliphatically bound nitrogen atom, said reaction being carried to an NCO-value of substantially zero, and neutralizing said reaction product with an inorganic or organic acid.

11. The process of claim 10 including in the reaction product a component (C) carrying per molecule an average of from 0.8 to 1.5 free isocyanate groups and from 1 to 3 ethylenically unsaturated double bonds.

* * * * *